(12) United States Patent
Gassner et al.

(10) Patent No.: US 10,055,848 B2
(45) Date of Patent: Aug. 21, 2018

(54) THREE-DIMENSIONAL IMAGE SEGMENTATION BASED ON A TWO-DIMENSIONAL IMAGE INFORMATION

(71) Applicant: Brainlab AG, Munich (DE)

(72) Inventors: Juergen Gassner, Unterfoehring (DE); Uli Mezger, Heimstetten (DE); Valentin Elefteriu, Kirchheim (DE); Stefan Vilsmeier, Munich (DE)

(73) Assignee: Brainlab AG, Munich (DE)

( * ) Notice: Subject to any disclaimer, the term of this patent is extended or adjusted under 35 U.S.C. 154(b) by 69 days.

(21) Appl. No.: 14/763,314

(22) PCT Filed: Jan. 29, 2013

(86) PCT No.: PCT/EP2013/051639
§ 371 (c)(1),
(2) Date: Jul. 24, 2015

(87) PCT Pub. No.: WO2014/117805
PCT Pub. Date: Aug. 7, 2014

(65) Prior Publication Data
US 2015/0371390 A1 Dec. 24, 2015

(51) Int. Cl.
*G06T 7/00* (2017.01)
*G06T 7/73* (2017.01)
*G06T 7/10* (2017.01)

(52) U.S. Cl.
CPC .......... *G06T 7/0044* (2013.01); *G06T 7/0012* (2013.01); *G06T 7/10* (2017.01);
(Continued)

(58) Field of Classification Search
CPC ......... G06T 7/0042; G06T 2207/10056; G06T 2207/30016; G06T 7/0044; G06T 2207/30096; G06T 7/0012; G06T 7/0079
See application file for complete search history.

(56) References Cited

U.S. PATENT DOCUMENTS 5,999,840 A 12/1999 Grimson et al.
2006/0173357 A1* 8/2006 Vilsmeier ............. A61B 5/103
600/476
(Continued)

OTHER PUBLICATIONS

Ralf A. Kockro, M.D., "Virtual Temporal Bone: An Interactive 3-Dimensional Learning Aid for Cranial Base Surgery", May 2009, pp. 216-230, vol. 64, Operative Neurosurgery 2 (May 2009); http://www.ncbi.nlm.nih.gov/pubmed/19404102.
(Continued)

*Primary Examiner* — Sean Conner
*Assistant Examiner* — Pinalben Patel
(74) *Attorney, Agent, or Firm* — Middleton Reutlinger

(57) ABSTRACT

The invention relates to a data processing method of determining a transformation for transforming medical image data into a positional reference system, the method being executed by a computer and comprising the following steps: a) acquiring, from a medical imaging apparatus (5), medical image data comprising medical image information describing a two-dimensional image of an anatomical body part (1); b) acquiring medical image selection data comprising medical image selection information describing a selection (4) from the medical image information; c) acquiring imaging apparatus characteristic data comprising imaging apparatus characteristic information describing an imaging characteristic of the medical imaging apparatus (5); d) determining, based on the medical image data, medical image selection data and imaging apparatus characteristic data, selection position data comprising selection position information describing a three-dimensional position of an anatomical structure (2) in the anatomical body part (1) corresponding to the selection from the medical image information.

12 Claims, 3 Drawing Sheets

(52) U.S. Cl.
CPC .................. *G06T 7/73* (2017.01); *G06T 7/74* (2017.01); *G06T 2207/10056* (2013.01); *G06T 2207/30016* (2013.01); *G06T 2207/30096* (2013.01)

(56) References Cited

U.S. PATENT DOCUMENTS

| | | | |
|---|---|---|---|
| 2009/0185714 A1* | 7/2009 | Lindberg | G06T 7/40 382/100 |
| 2009/0208074 A1* | 8/2009 | Wiersma | G06T 7/251 382/128 |
| 2010/0129005 A1 | 5/2010 | Tao et al. | |
| 2013/0304446 A1* | 11/2013 | Rabinovitz | G06F 19/12 703/11 |
| 2014/0050375 A1* | 2/2014 | Baker | G06F 19/3481 382/128 |
| 2015/0320512 A1* | 11/2015 | Gassner | A61B 90/37 348/79 |
| 2016/0035093 A1* | 2/2016 | Kateb | A61B 6/5247 382/131 |
| 2016/0260211 A1* | 9/2016 | Gillies | G06T 7/41 |

OTHER PUBLICATIONS

Axel T. Stadie, "Neurosurgical craniotomy localization using a virtual reality planning system versus intraoperative image-guided navigation", Sep. 1, 2010, Int J Comput Assist Radiol Surg. Sep. 2011, pp. 1-8; http.//www.ncbi.nlm.nih.gov/pubmed/20809398.

European Patent Office, International Search Report of PCT/EP2013/051639 dated Oct. 15, 2013, pp. 1-4. European Patent Office, Rijswijk, Netherlands.

Michael Emmanuel Leventon, "A Registration, Tracking, and Visualization System for Image-Guided Surgery", May 2, 1997, URL: https://splweb.bwh.harvard.edu/archive/spl-pre2007/pages/papers/leventon/thesis/master/thesis.pdf, Internet.

T M Peters, "Image-guided surgery: from X-rays to virtual reality", Computer Methods in Biomechanics and Biomedical Engeineering, Informa Healthcare/Abingdon: Taylor & Francis, Jan. 1, 2000, pp. 27-57.

* cited by examiner

THREE-DIMENSIONAL IMAGE SEGMENTATION BASED ON A TWO-DIMENSIONAL IMAGE INFORMATION

The present invention is directed to a method, in particular data processing method, of determining a transformation for transforming medical image data into a positional reference system in accordance with claim 1, a corresponding computer program, program storage medium storing that program, computer running the program and a navigation system comprising that computer.

In surgical interventions which are supported by image guidance, in particular by video guidance, it is often desirable to overlay three-dimensional image information such as for example the outline of a tumour onto the two-dimensional guidance image, in particular video image. Known technologies for identifying the position of two-dimensional image features in a three-dimensional coordinate system used for navigating the surgical procedure are not computationally efficient and are therefore time-consuming or require special hardware.

The present invention therefore seeks to solve the problem of identifying the positions which specific features in the two-dimensional image information have in a corresponding three-dimensional coordinate system used for navigating the medical procedure. In particular, the present invention offers the operator an easy and intuitive way for segmenting structures of interest in the two-dimensional medical image information and making them available in a three-dimensional model of the surgical situs.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention as long as technically sensible and feasible. In particular, a feature of one embodiment which has the same or similar function of another feature of another embodiment can be exchanged. In particular, a feature of one embodiment which supplements a further function to another embodiment can be added to the other embodiment.

The method in accordance with the invention is in particular a data processing method. The data processing method is preferably performed using technical means, in particular a computer. The data processing method is in particular executed by or on the computer. Preferably, the inventive method is at least partly executed by a computer. That is, all steps or just some of the steps (i.e. less than a total number of steps) of the inventive method may be executed by a computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing" which describes computation, software, data access and storage services which do not require the end user to know the physical location and/or configuration of the computer delivering a specific service. In particular, the term "cloud" is used as a metaphor for the internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements and optionally a volatile memory (in particular, a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

The expression "acquiring data" encompasses in particular (within the framework of a data processing method) the scenario in which the data are determined by the data processing method or program. Determining data in particular encompasses measuring physical quantities and transforming the measured values into in particular digital data and/or computing the data by means of a computer, in particular computing the data within the method of the invention. The meaning of "acquiring data" in particular also encompasses the scenario in which the data are received or retrieved by the data processing method or program, for example from another program, a previous method step or a data storage medium, in particular for further processing by the data processing method or program. Thus, "acquiring data" can also for example mean waiting to receive data and/or receiving the data. The received data can for example be inputted via an interface. "Acquiring data" can also mean that the data processing method or program performs steps in order to (actively) receive or retrieve the data from a data source, for instance a data storage medium (such as for example a ROM, RAM, database, hard disc, etc.) or via the interface (for instance, from another computer or a network). The data can achieve the state of being "ready for use" by performing an additional step before the acquiring step. In accordance with this additional step, the data are generated in order to be acquired. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. Thus, "acquiring data" can also involve commanding a device to obtain and/or provide the data to be acquired. The acquiring step in particular does not involve an invasive step which would represent a substantial physical interference with the body requiring professional medical expertise to be carried out and entailing a substantial health risk even when carried out with the required professional care and expertise. Acquiring, in particular determining, data in particular does not involve a surgical step and in particular does not involve a step of treating a human or animal body using surgery or therapy. This also applies in particular to any steps directed to determining data. In order to distinguish the different data used by the present method, the data are denoted (i.e. referred to) as "XY data" and the like and are defined by the information which they describe which is preferably called "XY information".

In the field of medicine, imaging methods are used to generate image data (for example, two-dimensional or three-dimensional image data) of anatomical structures (such as soft tissues, bones, organs, etc.) of the human body. Medical imaging methods are understood to mean advantageously apparatus-based imaging methods (so-called medical imaging modalities and/or radiological imaging methods), such as for instance computed tomography (CT) and cone beam computed tomography (CBCT; in particular volumetric CBCT), x-ray tomography, magnetic resonance tomography (MRT or MRI), conventional x-ray, sonography and/or ultrasound examinations, and positron emission tomography. Analytical devices are in particular used to generate the image data in apparatus-based imaging methods. In the framework of the present disclosure, techniques of video or photographic imaging are also understood to be imaging methods (which are executed by using a camera, in particular a video camera, as an analytical device). The imaging methods are in particular used for medical diagnostics, to analyse the anatomical body in order to generate images which are described by the image data. The imaging methods are in particular used to detect pathological changes in the human body. However, some of the changes in the anatomical structure, in particular the pathological changes in the structures (tissue), may not be detectable and in particular may not be visible in the images generated by the imaging methods. A tumour for example represents an example of a change in an anatomical structure. If the tumour grows, it may then be said to represent an expanded anatomical structure. This expanded anatomical structure may not be detectable; in particular, only a part of the expanded anatomical structure may be detectable. Primary/high-grade brain tumours are for example usually visible on MRI scans when contrast agents are used to infiltrate the tumour. The MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and in particular discernible in the image generated by the imaging method. In addition to these tumours, referred to as "enhancing" turnouts, it is thought that approximately 10% of brain tumours are not discernable on a scan and are in particular not visible to a user looking at the images generated by the imaging method.

The present invention is directed to a method, in particular a data processing method, of determining a transformation for transforming medical image data into a positional reference system. The method is preferably executed by a computer and preferably comprises the following steps.

Preferably, medical image data is acquired from a medical imaging apparatus. The medical image data comprises medical image information which describes in particular a two-dimensional image of an anatomical body part. The medical imaging apparatus is at least one of a video camera, a microscope or a camera for taking still images. The medical imaging apparatus can also be embodied by an endoscope which in particular comprises at least one of the aforementioned types of imaging apparatus. Besides that, the medical imaging apparatus may also be embodied by a magnetic resonance or computer tomography or conventional X-ray apparatus. In case the medical imaging apparatus is a video camera, the medical image information preferably is video information which is in particular taken in-situ, i.e. video information which comprises image information describing a surgical situs. If the medical image apparatus is embodied by a microscope or a still image camera, the medical image information is in particular still image information, in particular in-situ still image information, i.e. still image information describing a surgical situs. The medical image information is preferably defined in two dimensions and therefore represents a two-dimensional image of a three-dimensional structure, in particular of an anatomical body part. The anatomical body part in particular comprises at least one of soft tissue (for example, brain tissue, liver tissue, or lung tissue) and bony tissue (for example, bone or cartilage).

Preferably, the medical imaging apparatus is navigated. For example, medical imaging apparatus position data is acquired which comprises medical imaging apparatus position information. For example, at least one marker for detection by a navigation system is attached to the medical imaging apparatus with a predetermined and preferably fixed spatial relationship relative to the medical imaging apparatus.

Preferably, also the anatomical body part is navigated. For example, anatomical body part position data is acquired which comprises anatomical body part position information. For example, at least one marker for detection by a navigation system is attached to the body of the patient to whom the anatomical body part belongs. The at least one marker is attached to the body in particular with a predetermined and preferably also fixed spatial relationship relative to the anatomical body part. The spatial relationship is preferably known within the framework of the inventive method. For example, medical image data such as image data acquired from a CT scanner which represents the anatomical body part may be acquired before or during execution of the inventive method and serve as a basis for determining that spatial relationship between the at least one marker and the anatomical body part. Thereby, the position of the anatomical body part may be tracked by the navigation system during execution of the inventive method.

It is the function of a marker to be detected by a marker detection device (for example, a camera or an ultrasound receiver or analytical devices, like CT or MRI), such that its spatial position (i.e. its spatial location and/or alignment) can be determined. The detection device is in particular part of a navigation system. The markers can be active markers. An active marker can for example emit electromagnetic radiation and/or waves, wherein said radiation can be in the infrared, visible and/or ultraviolet spectral range. The marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can also, however, exhibit a cornered—for example, cubic—shape.

A marker device can for example be a reference star or a pointer or one marker or more than one (individual) markers which are preferably in a predetermined spatial relationship. A marker device comprises one, two, three or more markers which are in case of two or more markers in a predetermined spatial relationship. This predetermined spatial relationship is in particular known to a navigation system and for example stored in a computer of the navigation system.

A navigation system, in particular a surgical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) in particular comprises a processor (CPU), a working memory, advantageously an indicating device for issuing an indication signal (for example, a visual indicating device such as a monitor and/or an audio indicating device such as a loudspeaker and/or a tactile indicating device such as a vibrator) and advantageously a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

The medical imaging apparatus position information describes in particular a position of the medical imaging apparatus in a navigation coordinate system. The navigation coordinate system is in particular a coordinate system in which positions of interest, in particular the positions of medical instruments, the medical imaging apparatus and the anatomical body part are defined during a medical procedure and in which the navigation data processed by the navigation system describes it.

Preferably, medical image selection data is acquired by the inventive method which comprises medical image selection information. The medical image selection information describes (in particular, represents and/or is) in particular a selection from the medical image information, i.e. a subset of the medical image information. The medical image selection data, in particular the medical image selection information, is acquired preferably based on user inputs, in particular determined by marking image features which are displayed to the user based on for example touch-screen input or pointer to input. By doing so, the user is enabled to mark at least one specific region of the anatomical body part which is of particular interest to him. Preferably, the medical image selection information comprises metadata comprising metainformation describing the selection such as contour information describing a contour in the medical image information. The contour may for example be highlighted for visual recognition by the user and preferably delineates a region of interest which belongs to the anatomical body part. Alternatively or additionally, the medical image selection information may comprise point image information, in particular consist of a single image information unit such as a pixel. The medical image selection data may alternatively or additionally be determined automatically, for example by segmentation of the medical image information to detect image features such as contours and preferably outline them automatically. In particular, an image segmentation algorithm is run on the medical image information in order to determine such image features. Advantageously, the inventive method provides a user with a possibility of interaction and re-running the image segmentation algorithm (preferably with different parameters than before) in case the image segmentation algorithm in the first place leads to wrong detection of the image features (which may be checked for example by user interaction, in particular by viewing the output). In the case of automatic determination of the medical image selection data, the user is preferably presented with the result of such an automatic determination in particular in the form of a graphical display of the image features. In most cases, the automatic determination will lead to detection of numerous in particular coherent image features, in particular of image regions. The user is therefore preferably provided with a possibility of interaction for manual selection of the desired image feature (image region) as the selection from the medical image data.

Preferably, imaging apparatus characteristic data is acquired which comprises imaging apparatus characteristic information. The imaging apparatus characteristic information describes in particular an imaging characteristic of the medical imaging apparatus. The imaging characteristic in particular is an optical quantity which describes the optical properties of the medical imaging apparatus. More particularly, the imaging characteristic is the position of the focal plane, in particular the focal length, of the medical imaging apparatus. Preferably, the imaging apparatus characteristic data also comprises information about the geometry of the medical imaging apparatus, in particular information about the position of an image generating part of the medical imaging apparatus such as a lens (in particular in the case of the medical imaging apparatus being a video camera, microscope or still image camera) or of the corresponding imaging characteristics of an X-ray-based medical imaging apparatus such as a CT or X-ray apparatus. These corresponding imaging characteristics are preferably described by focal length correspondence information contained in focal length correspondence data which is preferably acquired by the inventive method. The corresponding characteristics of such apparatuses comprise for example information about the energy and/or wavelength of the used X-rays, information about the image contrast in particular at image contours or information about light intensity patterns at at least two spaced-apart locations in the medical image information (for phase detection). Alternatively or additionally, the focal length correspondence information may describe the image entropy of the medical image information which may be used as a physical quantity (in particular for a medical image taken with an X-ray-based medical imaging apparatus) which corresponds to the focal length of a lens-based classical imaging apparatus such as a video camera, microscope or still image camera. In a grey scale image, the image entropy is understood to be a statistical measure of randomness that can be used to characterize the texture of the grey scale image. For example, an image consisting of only black or only white colour information has no image entropy, while more complex images having both black and white colour values and/or a grey scale colour values lying inbetween black and white have a positive value of image entropy. It is generally assumed that, the lower the value of image entropy is, the more focused the (in particular X-ray-based) image appears, in particular the clearer contours are rendered in the image.

Alternatively or additionally, the focal length correspondence information for an X-ray-based medical imaging apparatus may describe the focal length of refractive-X-ray optics used for focusing the X-rays.

Preferably, the medical image information is focused image information. In particular, the medical image information describes a physical structure, more particularly the anatomical body part, which was imaged by the medical imaging apparatus at a distance from the medical imaging apparatus which corresponds to (in particular is equal to) its focal length. Thereby, the distance between the imaged physical structure and in particular the image generating unit can be determined based on the imaging apparatus characteristic information and in particular the focal length correspondence information Preferably, selection position data is determined based on the medical image data (in particular, the medical image information), the medical image selection data (in particular, the medical image selection information) and the imaging apparatus characteristic data (in particular, the imaging apparatus characteristic information). The selection position data preferably comprises a selection position information which describes in particular a three-dimensional position of a physical (in particular, anatomical) structure (which belongs in particular to the anatomical body part and can comprise at least one of soft tissue and bony tissue). The anatomical structure corresponds to the selection from the medical image information. In particular, the selection position information describes the three-dimensional position of the physical structure in the navigation reference system. The selection position information therefore is determined preferably additionally based on the medical imaging apparatus position data. Preferably, the selection position data is determined by mapping the medical image selection data onto a model of the anatomical body part. The medical image selection data, in particular the selection from the medical image information, is preferably defined in two dimensions, and the model of the anatomical body part is preferably defined in three dimensions. The model of the anatomical body part is advantageously determined and preferably generated based on medical image data acquired from a computer tomography or magnetic resonance tomography, in particular by segmenting CT-based or MRT-based medical image information which describes, in particular represents the anatomical body part. The two-dimensional medical image selection information is then mapped onto such a pre-segmented three-dimensional model of the anatomical body part in particular based on a transformation which transforms the two-dimensional medical image selection information into the three-dimensional coordinate system in which the model of the anatomical body part is defined. The transformation is preferably determined during execution of the inventive method. It is determined in particular based on information about the position of the medical imaging apparatus relative to the anatomical body part which is advantageously acquired based on the position information acquired by navigation of at least one of the medical imaging apparatus and the anatomical body part. The transformation is determined preferably further based on the imaging apparatus characteristic information. Thereby, a positional relationship between the image features described by the medical image information and the anatomical body part can be determined. Such mapping of the selection position information onto the model of the anatomical body part is in particular useful for providing a visual display of the selection (i.e. the anatomical structure) in a model of the anatomical body part which is used in particular as visual guidance information for conducting a navigated medical procedure. The mapping into the three-dimensional coordinate system in which the anatomical body part is described provides the advantage of being able to move, in particular shift and/or rotate, the visual display of the model of the anatomical body part while enabling to have image data describing (in particular representing) the selection still displayed in the model in the corresponding perspective. Therefore it is an aim of the inventive method to provide a graphical display of the selection from the medical image data as a mapping of the selection onto a three-dimensional model of the anatomical body part while assuring that the selection is displayed in the correct perspective, in particular in the perspective from which the model is viewed in particular by a user.

Assuming that the medical image information is focused image information, the selection position data is determined preferably based on focal transformation data comprising focal transformation information. The focal transformation information describes in particular a transformation (more particularly, a mapping) from the imaging plane of the medical imaging apparatus to the focus of the medical imaging apparatus. The focal transformation information more particularly describes rotations and translations between the focus of the medical imaging apparatus and the imaging position to which a point lying in that focus is projected during the imaging process. The imaging position is in particular located in an imaging plane of the medical imaging apparatus such as in particular the surface of a semiconductor-based imaging element. The rotations and translations are embodied in particular by an affine (linear) transformation which is described preferably by 4×4 matrices or a single-column vector (depending on the number of degrees of freedom to be transformed, in particular mapped).

Preferably, three-dimensional navigation data comprising three-dimensional navigation information for navigating a medical procedure on the anatomical body part is acquired. The three-dimensional navigation information is used in particular for informing the user about a position of a medical instrument in particular relative to the anatomical body part. The medical instrument may be for example a cauter or a cutting instrument. Preferably, the three-dimensional navigation information is updated based on the selection position data (in particular, based on the selection position information). Thereby, the user is provided with updated information about the position of the selected anatomical structure for example in case a change in the anatomical structure has taken place (for example, due to surgical removal of tissue which in particular in the case of soft tissue may lead to a positional change of the remaining tissue).

Preferably, the medical image information is overlaid with functional image information which describes in particular a function (more particularly a physiologic function) of the anatomical body part. Such an overlay with functional image information may be used to highlight anatomical regions of interest to the user which may be in particular organs at risk, affection of which by the medical procedure should be avoided. Thereby, the user is supported in navigating the medical procedure and also given additional information on the basis of which he may enter his user input for acquiring the medical image selection data. Such an overlay is preferably effected based on the selection position information and in particular also predetermined medical image information (which has been in particular generated by a CT scanner) describing the anatomical body part. On that basis, it can be determined which anatomical region of a patient's body is currently being imaged by the medical imaging device and corresponding predetermined medical image information can be determined in particular based on the selection position information. The corresponding medical image information is preferably associated with the functional image information.

Preferably, navigation of the medical procedure comprises a visual output to the user which informs him about the visual appearance of the surgical situs. The visual output in particular takes the form of a three-dimensional model of the anatomical body part. Preferably, the selection from the medical image information is displayed in this visual output based on the selection position data so that the user is given an impression of (in particular, visual information about) the position of the selection relative to the rest of the anatomical body part.

The disclosed method, in particular any method step associated with or directed to acquiring the medical image information or the medical image selection information, does not involve an invasive step which would represent the substantial physical interference with the human or animal body requiring professional medical expertise to be carried out and entailing a substantial health risk even when carried out with the required professional care and expertise. Furthermore, no part of the inventive method involves a step of treating a human or animal body using surgery or therapy. Rather, the invention is said to also relate to a method of operating, in particular controlling, a medical navigation system which involves determining the position of an anatomical structure represented by a selection from the medical image information.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

In the following, a short general account of the present invention is given.

The invention is in particular directed to offering a user such as a surgeon or a medical technician an easy and intuitive way of segmenting structures of interest in a two-dimensional video image and making those structures available in a three-dimensional model of the anatomical body part. The user simply outlines the structures in the two-dimensional medical image information and the two-dimensional outline is calculated back onto the three-dimensional image model data by means of the navigation system. For example, a two-dimensional segmented object such as a craniotomy may be used in combination with a three-dimensional segmented skull and a skull may then be clipped to represent the craniotomy in the three-dimensional model.

Another application of the inventive method includes outlining vessel structures on the cortex as visualized by a contrast agent (in particular indocyanine green—ICG) microscopy. Such contrast agent microscopy can be used to visualize arterial and veinial vessels through the dura after opening the skull. Veins marked by the contrast agent ("glowing" veins) can be easily outlined on the two-dimensional video image (manually or automatically) and in combination with the segmented three-dimensional cortex in the navigation model, a three-dimensional representation of the vessel on the cortex can be determined. The vessel objects are then available before further navigation persistently even if the application of the contrast agent ceases.

In the following, a specific embodiment of the invention shall be described with reference to the figures. The specific embodiment shall not be understood to limit the invention only to those features shown in the figures.

Figure 1:
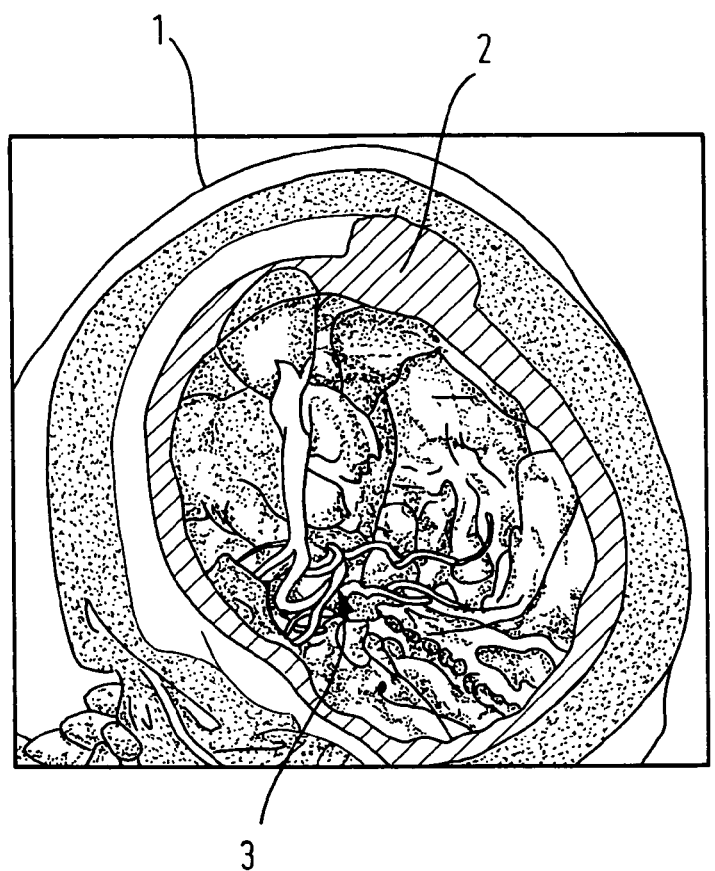
FIG. 1 shows the general anatomic situation as shown in a three-dimensional visualized navigation model of a craniotomy.
Figure 2:
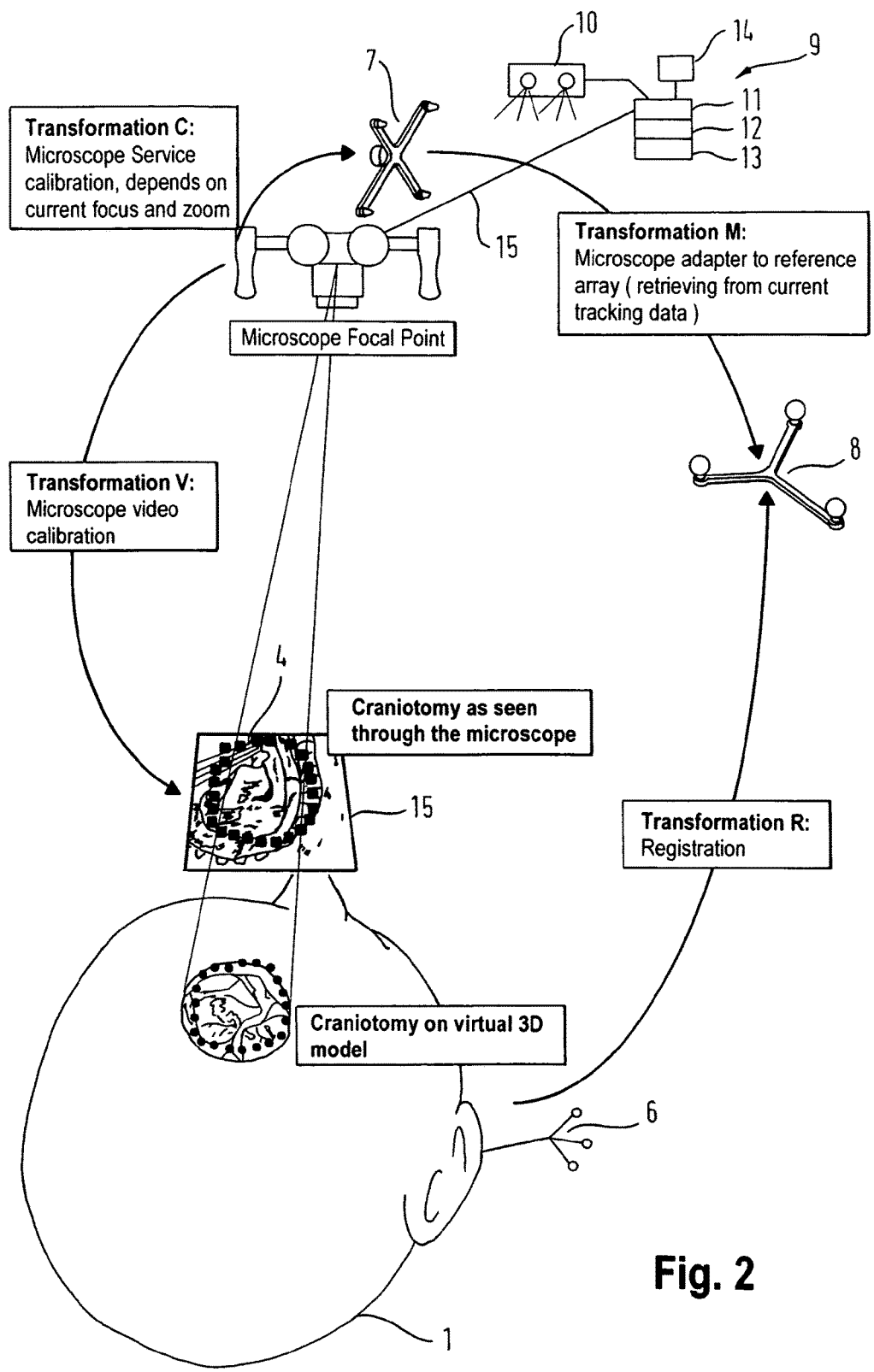
FIG. 2 shows a general setup for conducting a medical procedure involving the inventive data processing method.

The example of FIGS. 1 and 2 refers to applying the inventive data processing method to a craniotomy in a neurosurgical procedure. Currently, a user (in particular, a surgeon) rarely outlines the plan the bone flap one the medical image data preoperatively and almost never takes the time or effort to outline the real skull opening intraoperatively in the medical image data. Preoperative planning of the exact bone flap is difficult because the final positioning of the patient head in the head clamp used for fixing its position can vary to allow for optical surgical access and a convenient position for the surgeon. The invention brings along several advantages by enabling accurate and easy segmentation of the exact skull opening in the medical image data. For example, the three-dimensional model of the skull determined, in particular calculated or segmented, from the medical image data could be clipped at the right positions reflecting the real craniotomy. The surgeon is then able to easily verify if his craniotomy is correct in relation to other segmented structures on the cortex of interest, like gyri vessels or functional areas of the brain.

FIG. 1 shows the general anatomic structure in a surgical situs comprising a craniotomy 2 in a skull 1. The image in FIG. 1 resembles the visual navigation information presented to a user of the inventive method. In this visual navigation information, specific anatomic structures, in particular organs at risk, such as blood vessels 3 are shown separately in a three-dimensional fashion.

FIG. 2 shows a general setup for implementing the inventive method of determining a transformation. A microscope 5 is used to image a craniotomy 3 in a skull 1 to which a reference star 6 is attached. A reference star 7 is attached to the microscope 5 and a reference star 8 is used as a common basis for determining the positions of reference stars 6 and 7 in a positional reference system of the navigation system 9 (also called navigation reference system). The navigation is supported by evaluating the positions of the reference stars 6, 7, 8 which are tracked by a stereotactic camera 10. The stereotactic camera 10 is operatively coupled to a computer comprising a microprocessor 11, a random access memory 12 and preferably also a non-volatile memory 13 (such as a hard disc). The stereotactic camera 10 transmits signals to the computer which are used as a basis for determining the positions. The microscope 5 is connected to the computer by a data line 15 for transmitting the medical image information to the navigation system 9. The navigation system 9 comprises in the case of FIG. 2 the stereotactic camera 10, the computer and a visual indicating device such as a monitor 14 while outputting the guidance information to the user.

The microscope 5 generates medical image information describing the surgical situs 15 such that the image is focused. In particular, the focal point of the microscope 5 is predetermined and known and the microscope 5 is adjusted so that the surgical situs 15 is located in the focal point. The positional information contained in the two-dimensional medical image information is in accordance with the invention transformed into a three-dimensional navigation reference system in which the navigation system 9 conducts the navigation and on the basis of which guidance information is outputted by the monitor 14.

A point is defined as PV(x1, y1, z1) with z1=0 in the two-dimensional coordinate system in which the medical image information is defined. The transformation of such a point into the three-dimensional coordinates PP (x2, y2, z2) of a patient-centred coordinate system (a so-called patient coordinate system resting relative to the patient) is then conducted by applying the equation PP(x2, y2, z2)= $R^{-1}*M*C*V^{-1}*PV$. In this equation, V denotes the transformation between the position of the microscope 5 and its focal point at which the surgical situs is located. V is also termed microscope video calibration and is an example of the imaging apparatus characteristic information. V in particular serves to transform positions in the medical image information into the navigation reference system. The parameters of V are preferably determined during a calibration process of the microscope 5. C denotes the so-called microscope service calibration which depends on the current focus and zoom and serves to transform positional information from the microscope coordinate system into the navigation reference system in which the reference star 7 is navigated. The parameters of C are determined during a calibration process of the microscope 5. M denotes a transformation for the position of the reference star 7 to the base reference star 8 and therefore a transformation from the position of the microscope 5 to the navigational reference system. The parameters of M are updated based on the results of tracking the reference stars 7 and 8. R represents a registration transformation between the position of the skull 1 (and/or the reference star 6 having a predetermined and preferably fixed spatial relationship relative to the skull 1) and the position of the based reference star 8 and therefore a transformation before determining the position of the skull 1 (and/or the reference star 6) in the navigational reference system.

The coordinates of the focal point FP of the microscope 5 in a coordinate system which rests relative to the skull 1 (the patient coordinate system) is determined as $FP=R^{-1}*M*FM$, wherein FM denotes the coordinates of the focal point of the microscope 5 in the microscope coordinate system, i.e. a coordinate system in which the microscope 5 rests.

All transformation matrices, i.e. R, M, C and V are 4×4 matrices including a rotational and a translational part.

Based on the above equation, an axis can be defined on which both FP and PP lie. This axis can be intersected with a segmented part of the actual three-dimensional medical image data of the patient which has been acquired for example beforehand by using a computer tomograph which works on the basis of X-rays. This axial projection is repeated for all points contained in the two-dimensional medical image information generated by the microscope 5. The result is a set of points defined in three-dimensional coordinates in the patient coordinate system, the set representing the real craniotomy. The set of three-dimensional points represents the selection position data and can be used to crop the segmented selection from the medical image information (representing bone and skin) for a correct display of the actual craniotomy in the visual guidance information displayed on the monitor 14.

Figure 3:
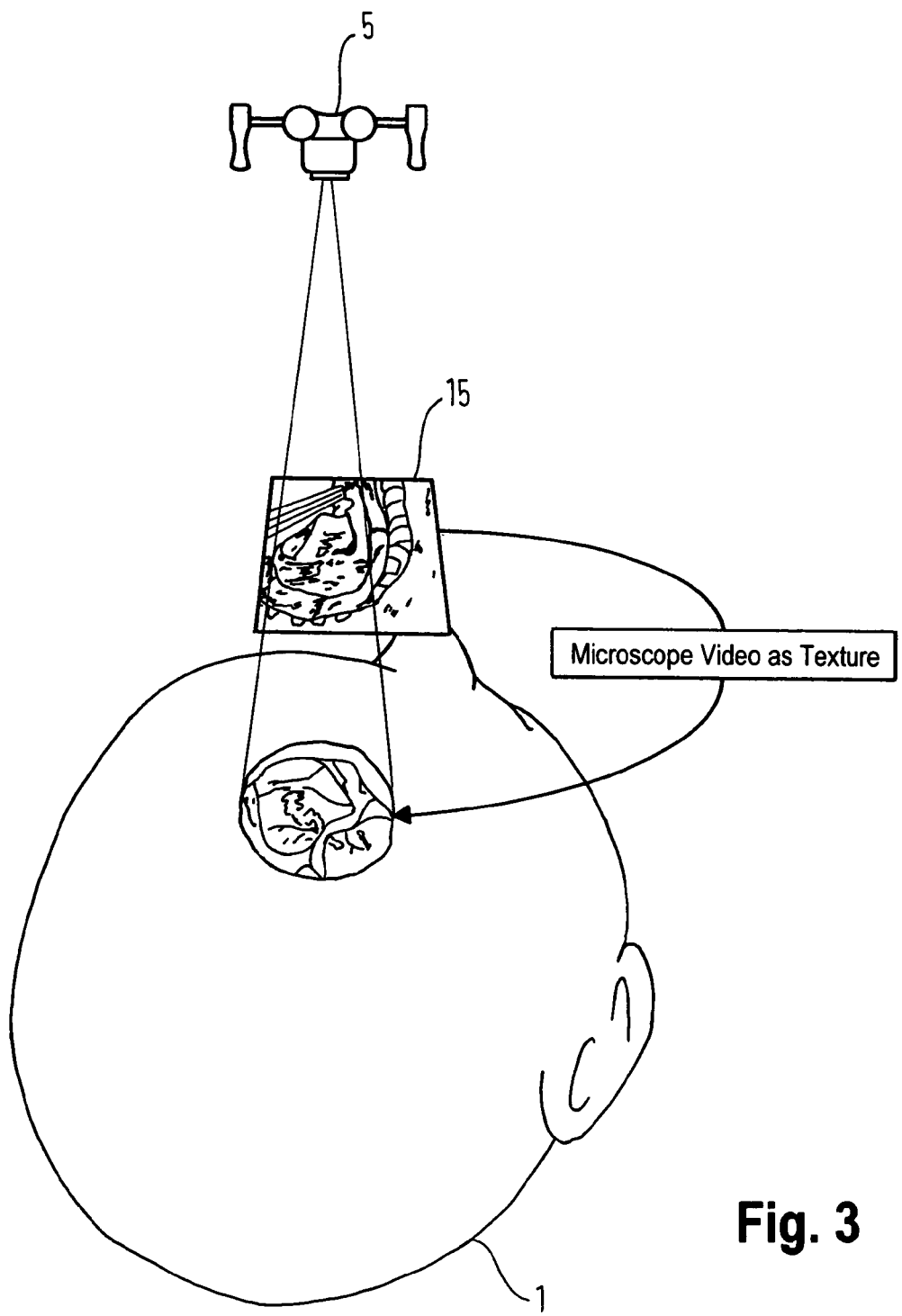
FIG. 3 shows an overlay of live medical image information onto a three-dimensional model of a skull having a craniotomy.

FIG. 3 describes the principle of overlaying (in particular mapping) the live medical image information 15 acquired by the microscope 5 onto a three-dimensional model of the skull 1 having a craniotomy 3. On the basis of determining the transformation for the coordinates of FM to the coordinates of FP in the patient coordinate system, the display of the visual guidance information can be enhanced by overlaying the three-dimensional medical image information 15 onto the display model of the skull 1. In particular, the medical image information 15 can be used as a texture in model of the skull 1. Additionally, functional information such as image information describing organs at risk can also be displayed in the model.

On this basis, the display of the model can be corrected for brain shift, for example by rotating the three-dimensional model until segmented anatomical structures such as three-dimensional models of gyri or vessels match with the gyri or vessels acquired on the basis of the two-dimensional medical image information 15.

The invention claimed is:

1. A computer-implemented medical method for creating a positional reference system, the method comprising executing, on a processor of a computer, steps of:
   acquiring, at the processor and from a medical imaging apparatus, medical image data comprising focused medical image information describing a two-dimensional image of an anatomical body part;
   acquiring, at the processor, medical image selection data comprising medical image selection information describing a selection from the medical image information;
   acquiring, at the processor, imaging apparatus characteristic data comprising imaging apparatus characteristic information describing an imaging characteristic of the medical imaging apparatus, wherein the medical imaging apparatus characteristic information comprises optical characteristic information describing the focal length of the medical imaging apparatus; and
   determining, by the processor and based on the medical image data, medical image selection data and optical characteristic information, selection position data comprising selection position information describing a three-dimensional position of an anatomical structure in the anatomical body part, the anatomical structure corresponding to the selection from the medical image information,
   wherein the selection position data is determined based on focal transformation data comprising focal transformation information describing a transformation from the imaging plane of the medical imaging apparatus to the focus of the medical imaging apparatus.

2. The method according to claim 1, wherein the selection from the medical image information is represented by two-dimensional image information and is mapped onto a three-dimensional model of the anatomical body part.

3. The method according to claim 1, wherein the medical image information is video information, and the medical imaging apparatus is a video camera or wherein the medical image information is still image information and wherein the medical image apparatus is a microscope or a camera for taking still images.

4. The method according to claim 1, wherein three-dimensional navigation data comprising three-dimensional navigation information for navigating a medical procedure on the anatomical body part is acquired and wherein the three-dimensional navigation information is updated based on the selection position data.

5. The method according to claim 1, wherein medical imaging apparatus position data is acquired comprising medical imaging apparatus position information describing a position of the medical imaging apparatus in a navigation coordinate system and wherein the medical image selection data is determined based on the medical imaging apparatus position data.

6. The method according to claim 1, wherein the medical image information is overlaid with functional image information describing a function of the anatomical body part.

7. The method according to claim 1, comprising a step of displaying the selection from the medical image information based on the selection position data.

8. The method according to claim 7, wherein the selection from the medical image information is overlaid on visual guidance information used for conducting a navigated medical procedure.

9. The method according to claim 1, wherein the medical image selection data is acquired based on at least one of user input, in particular touch-screen or pointer tool input, and automatic determination of image features described by the medical image information, for example by running an image segmentation algorithm on the medical image information.

10. A navigation system for a medical procedure, comprising:
    a computer configured to execute a computer-implemented method of determining a transformation for transforming medical image data into a positional reference system, the method comprising executing, on the processor, steps of:
    acquiring, at the processor and from a medical imaging apparatus, medical image data comprising focused medical image information describing a two-dimensional image of an anatomical body part;
    acquiring, at the processor, medical image selection data comprising medical image selection information describing a selection from the medical image information;
    acquiring, at the processor, imaging apparatus characteristic data comprising imaging apparatus characteristic information describing an imaging characteristic of the medical imaging apparatus, wherein the medical imaging apparatus characteristic information comprises optical characteristic information describing the focal length of the medical imaging apparatus; and
    determining, by the processor and based on the focused medical image data, medical image selection data and optical characteristic information, selection position data comprising selection position information describing a three-dimensional position of an anatomical structure in the anatomical body part, the anatomical structure corresponding to the selection from the medical image information;
    the navigation system further comprising:
    a detection device for detecting the position of the medical imaging apparatus; and
    a data interface for receiving information about the position of the medical imaging apparatus for supplying that information to the computer,
    wherein the selection position data is determined based on focal transformation data comprising focal transformation information describing a transformation from the imaging plane of the medical imaging apparatus to the focus of the medical imaging apparatus.

11. A non-transitory computer-readable program storage medium storing a program which, when running on a processor of a computer or when loaded into a memory of the computer, causes the computer to perform a computer-implemented method of determining a transformation for transforming medical image data into a positional reference system, the method comprising executing, on a processor of a computer, steps of:
    acquiring, at the processor and from a medical imaging apparatus, medical image data comprising focused medical image information describing a two-dimensional image of an anatomical body part;

acquiring, at the processor, medical image selection data comprising medical image selection information describing a selection from the medical image information;

acquiring, at the processor, imaging apparatus characteristic data comprising imaging apparatus characteristic information describing an imaging characteristic of the medical imaging apparatus, wherein the medical imaging apparatus characteristic information comprises optical characteristic information describing the focal length of the medical imaging apparatus; and determining, by the processor and based on the medical image data, medical image selection data and optical characteristic information, selection position data comprising selection position information describing a three-dimensional position of an anatomical structure in the anatomical body part, the anatomical structure corresponding to the selection from the medical image information, wherein the selection position data is determined based on focal transformation data comprising focal transformation information describing a transformation from the imaging plane of the medical imaging apparatus to the focus of the medical imaging apparatus.

12. A computer, comprising the program storage medium of claim 11.

* * * * *